March 3, 1942. M. P. LAURENT 2,275,301
COUPLING
Filed March 30, 1940
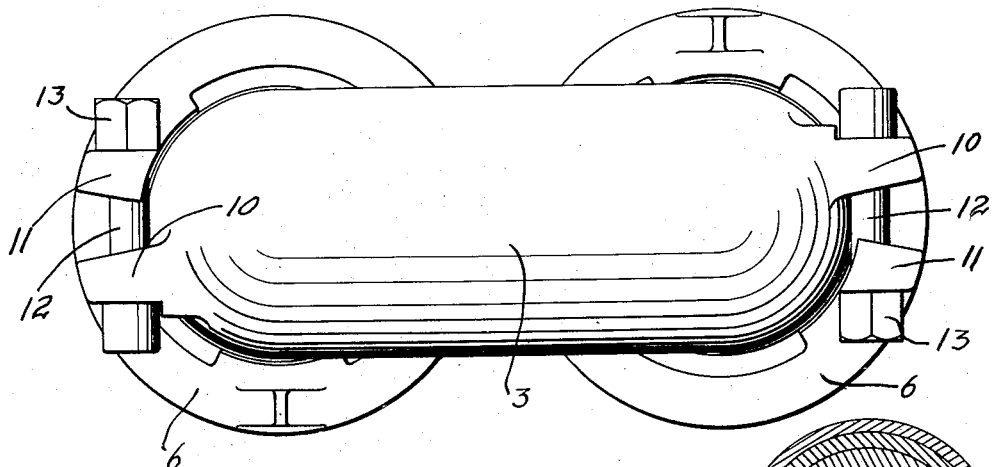
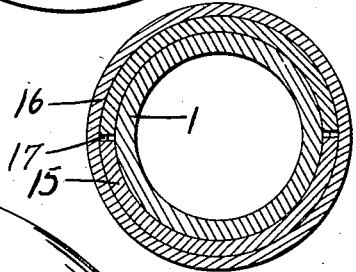
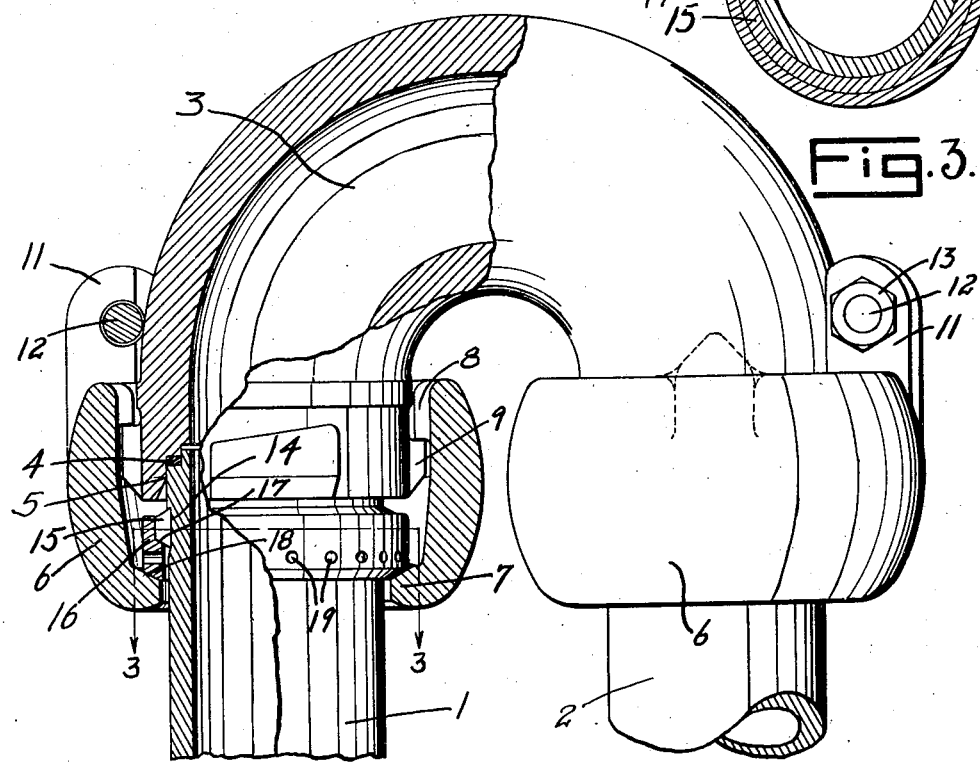
INVENTOR.
Milton P. Laurent.
By J. Vincent Martin
Ralph R. Browning
ATTORNEYS Patented Mar. 3, 1942

2,275,301

UNITED STATES PATENT OFFICE 2,275,301

COUPLING

Milton P. Laurent, Houston, Tex.

Application March 30, 1940, Serial No. 326,875

7 Claims. (Cl. 285—120)

This invention relates to a pipe coupling and particularly to a means for securing a pipe coupling to the end of a section of tubing. In connecting a union type coupling to the end of a tubing the ordinary procedure is to upset the ends of the tubing externally so as to provide a flange on the ends of the tubing for receiving the union nut. This is expensive and is an operation that must be carried out with extreme precision in order that the parts may operate properly.

It is an object of this invention to provide a section of tubing with a means for receiving a union nut or the like, without necessity for upsetting the tubing.

It is a further object of this invention to provide a means on a tubing section for receiving a union nut, and to provide means whereby a circulation through the union nut may be permitted in order to prevent overheating of the parts.

A further object of this invention is to provide a means which will remain permanently in place, yet which can be readily removed from the end of a tubing section, which means will serve to receive a union nut.

Other objects and advantages of this invention will become apparent from the following description taken in connection with the accompanying drawing wherein is set forth one embodiment of this invention.

In the drawing:

Figure 1 is a view partly in vertical cross section and partly in side elevation, illustrating a device constructed in accordance with this invention.

Figure 2 is an end elevation of the same device.

Figure 3 is a transverse cross-section taken along the line 3—3 of Figure 1.

In the particular embodiment illustrated there are shown two substantially parallel tube sections 1 and 2 joined at their adjacent ends by means of a return bend 3. Between the ends of the tube sections and the ends of the return bend respectively there are interposed sealing rings 4 of any suitable material, the return bend being counterbored at 5 for the purpose of receiving the tube end and retaining the sealing ring 4.

The ends of the return bend 3 and the respective tube sections 1 and 2 are secured together by means of a union nut 6 having an inwardly extending flange 7 at one end and inwardly extending tapered lugs 8 at its other end.

The tapered lugs 8 on the union nut 6 are intended to pass between and, upon rotation of the union nut, to engage and cooperate with the tapered lugs 9 on the end of the return bend in drawing the tube section toward the return bend. For the purpose of rotating the union nut in so drawing the tube section and return bend together, the return bend is formed with lugs 10 and the union nuts are formed with lugs 11 adapted to receive bolts 12 in the manner illustrated. When the nuts 13 on these bolts 12 are tightened it will be seen that the union nuts 6 will be rotated so that the lugs 8 will ride up on the lugs 9 and draw the tube sections 1 and 2 into tighter engagement with the return bend 3.

The union nut is anchored to the tubing by the structure which will now be described:

Instead of an upset on the end of the tubing, or welding material or some other arrangement which would possibly detract from the strength of the tubing, the tubing in this instance is provided with a circumferential channel 14. This channel may be formed with its edge which is toward the end of the tube section overhanging slightly. There is then provided a split ring 15 which may be formed in two sections as shown and placed within the groove 14. In order to hold these split ring sections in place there is also provided a continuous ring 16, having a part adapted to fit tightly around the outside of the split ring and hold it firmly and permanently in place, but capable of removal with little difficulty whenever desired. This solid ring 16 has a minimum internal diameter which is greater than the external diameter of the tube section, but which is less than the external diameter of the split ring so as to form a shoulder 17 adapted to abut against the split ring and limit movement of the solid ring over the split ring toward the end of the tube section.

That end of the solid ring which is remote from the end of the tube section is preferably formed with a spherical surface having its center at or beyond the end of the tube section. The flange 7 on the union nut 6 is likewise formed with a spherical surface adapted to seat against the spherical surface 18, so that the union nut may move with respect to the ring 16 to assume the proper angular position with respect to the tube section without, however, becoming in any way unseated with respect to the ring 16. This makes it possible for the nut itself to adjust itself with respect to the tube section both during the assembly of the joint and during the use of the device when the angular relation of the tubes may change due to temperature changes, etc.

In order that free circulation may be permitted through the union nut 6, the ring 16 is provided at intervals throughout its circumference with radial openings 19. These openings permit circulation of air or other fluid in which the coupling may be placed through the interior of the flange 7, radially through the openings 19, and thence through the union nut to the end opposite the flange 7. This circulation will serve to prevent excessive heating of the parts within the union nut and of the union nut itself when the tube and return bend assembly is used for very hot fluids. It is to be noted in this connection that if the union nut 6 is permitted to become hot, it will expand in length as well as in diameter, and the expansion in length will directly tend to loosen the joint, while the expansion in diameter will tend to permit the flange 7 to telescope over the ring 16 a slightly greater amount, thus also tending to loosen the joint. The circulation of air or other substance through the joint, however, tends to prevent the transmission of heat to the union nut itself and thus to keep this nut comparatively cool with respect to the tube and return bend. It will thus be seen that if the joint is made tight while all parts are cool and then a hot substance is placed within the tube and return bend, the expansion of the tube metal and the metal of the return bend will actually cause a tightening of the joint.

It will be seen from the foregoing that a means has been provided for carrying out all the objects and advantages sought by this invention, and particularly that a means has been provided whereby the effect of an upset end on a tube section may be obtained relatively cheaply, and yet with every advantage that could be obtained with an actual upset end construction. Furthermore, a continuous spherical seating surface is provided for the union nut which insures positive seating for the union nut against such surface at all times, and also the adjustment of the union nut angularly with respect to the tube member. Means has also been provided for avoiding the loosening effect which temperature changes might otherwise have, and for actually causing those temperature changes to produce a tightening effect on the joint.

Having described my invention, I claim:

1. In combination, a tube of substantially uniform outer diameter having a circular groove formed therein adjacent one end, a split ring in said groove, and an abutment and retaining ring having a part tightly embracing said split ring to retain the same in place in said groove, a part of smaller internal diameter adapted to abut said split ring and limit movement of said abutment ring over said split ring toward the end of the tube, and a part adapted to receive a coupling, said abutment ring being spaced from the outer surface of said tube and having ventilating openings therethrough intermediate its contact with said split ring and the part adapted to receive a coupling.

2. In combination, a tube of substantially uniform outer diameter having a circumferential groove formed therein adjacent one end, a split ring in said groove, a continuous abutment and retaining ring having a part tightly embracing said split ring to retain the same in place in said groove, a part of smaller internal diameter adapted to abut said split ring and limit movement of said abutment ring over said split ring toward the end of the tube, and a part providing a surface adapted to receive a coupling member, said surface being substantially spherical, and a coupling member having a substantially spherical surface engaging said substantially spherical surface on said abutment ring, whereby said coupling member may adjust itself angularly with respect to said tubing and said abutment ring.

3. In combination, a tube of substantially uniform outer diameter having an abutment of enlarged diameter thereabout adjacent one end, said abutment having a continuous surface adapted to receive a coupling member, and having ventilated openings therethrough to permit free circulation through the interior of such coupling member.

4. In combination, a tube having a circumferential groove formed therein adjacent one end, a split ring in said groove, an abutment and retaining ring continuous throughout its circumference having a part embracing said split ring to retain the same in place in said groove, a part of smaller diameter adapted to abut said split ring and limit movement of said abutment ring over said split ring toward the end of the tube, and a part providing a surface adapted to receive a coupling member, said surface being substantially spherical.

5. In combination, a tubing having an external recess formed therein adjacent to and spaced from one end, a stop member engaging in said recess and having a part projecting from said recess when fully engaged therewith to provide a stop, a continuous abutment and retaining ring about said tube having a part embracing said stop member to retain the same in place in said recess, a part adapted to abut said stop member and limit movement of said abutment ring over said stop member toward the end of said tube, and a part providing a surface adapted to receive a coupling member, said surface being substantially spherical.

6. In combination, a tubing having an external recess formed therein adjacent to and spaced from one end, a stop member engaging in said recess and having a part projecting from said recess when fully engaged therewith to provide a stop, a continuous abutment and retaining ring about said tube having a part embracing said stop member to retain the same in place in said recess, a part adapted to abut said stop member and limit movement of said abutment ring over said stop member toward the end of said tube, and a part providing a continuous surface adapted to receive a coupling member, and a continuous coupling member having a continuous surface adapted to seat on said continuous surface of the abutment ring to form a continuous bearing thereon.

7. In combination, a tube of substantially uniform outer diameter, having a circular groove formed therein adjacent one end, a split ring in said groove, and an abutment and retaining ring having a part tightly embracing said split ring to retain the same in place in said groove, a part of smaller internal diameter adapted to abut said split ring and limit movement of said abutment ring over said split ring toward the end of the tube, and a part adapted to receive a coupling, said abutment ring being spaced from the outer surface of said tube.

MILTON P. LAURENT.